Patented June 17, 1924.

1,498,316

UNITED STATES PATENT OFFICE.

WILLIAM W. BAUER, OF THURSTON, OHIO, AND HAROLD E. WOODWARD, OF PENNS-GROVE, NEW JERSEY, ASSIGNORS TO E. I. DU PONT DE NEMOURS & COMPANY, OF WILMINGTON, DELAWARE, A CORPORATION OF DELAWARE.

BLUE TRISAZO DYES.

No Drawing. Application filed December 2, 1921. Serial No. 519,403.

*To all whom it may concern:*

Be it known that we, WILLIAM W. BAUER and HAROLD E. WOODWARD, citizens of the United States, and residents of Thurston, in the county of Fairfield and State of Ohio, and Pennsgrove, in the county of Salem and State of New Jersey, respectively, have invented certain new and useful Blue Trisazo Dyes, of which the following is a specification.

This invention relates to trisazo dyes capable of dyeing unmordanted cotton blue shades of great brilliancy and fastness.

We have found that blue dyes of exceptional brightness and extreme fastness to light may be synthesized by diazotizing and coupling in the order named—1 mole of 1-aminobenzene-3-sulphonic acid (metanilic acid), 2 moles of 1-naphthylamine-6-or 7-sulphonic acid (Cleve's acid), and 1 mole of 2:5-aminonaphthol-7-sulphonic acid (J-acid) or its derivatives which are substituted in the amino group by the hydrocarbon radicals. The following formula graphically represents the constitution of these dyes:—

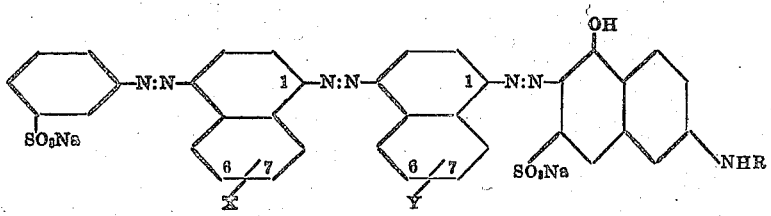

where X represents a sulphonic group in a beta position (i. e. a 6 or 7 position); Y represents a sulphonic group in a beta position; and R represents hydrogen or a hydrocarbon radical such as methyl, phenyl or tolyl.

To illustrate how the new dyes may be made the following examples are given:

*Example 1.*—19.5 kilograms of the sodium salt of 1-aminobenzene-3-sulphonic acid (metanilic acid) is diazotized at 5° C. with 9.0 kilograms of 100% hydrochloric acid and 6.9 kilograms of sodium nitrite. The solution of this diazo compound is allowed to run into a neutral solution of 24.5 kilograms of a mixture of the sodium salts of 1:6 and 1:7 naphthylamine sulphonic acids (Cleve's acid) which has been cooled below 5° C. After stirring six hours, the amino-azo compound thus formed is diazotized at 5° C. with 9.0 kilograms of 100% hydrochloric acid and 6.9 kilograms of sodium nitrite. The resulting diazo compound is introduced into a neutral solution containing 24.5 kilograms of a mixture of the sodium salts of 1:6 and 1:7 naphthylamine sulphonic acid (Cleve's acid) and 15 kilograms of sodium acetate. After the coupling is completed this disazo dye is precipitated from an alkaline solution by the addition of common salt. It is filtered from the mother liquor and redissolved in water at 50° C. The solution is cooled to 5° C. and diazotized with 18 kilograms of 100% hydrochloric acid and 6.9 kilograms of sodium nitrite. This diazo compound is added to a solution containing 24.0 kilograms of 2:5 amino-naphthol-7-sulphonic acid (J-acid) and 60 kilograms of sodium carbonate. The solution of the resulting dyestuff is heated to 80° C. and common salt is added to separate the dye from its mother liquor. The dyestuff is then filtered and dried.

The dye obtained by following the above procedure is a dark powder of bronzy appearance. It dissolves in water with a blue color. The acid dye is precipitated from aqueous solution by the addition of hydrochloric acid. The color becomes redder in acid solution. The dye dissolves in concentrated sulphuric acid with a green black color and on dilution with water it comes out as a red violet flocculent precipitate. Strong reducing agents destroy the dye, giving 1-aminobenzene-3-sulphonic acid, 1:4-naphthylenediamine-6-(7)-sulphonic acid and 2:6-diamino-5-naphthol-7-sulphonic acid. This gives on unmordanted cotton a greenish blue shade of great brilliancy. The dyeings are moderately fast to washing, acids, and alkalies, and extremely fast to light. One constituent of the dye has most probably the following graphical formula:—

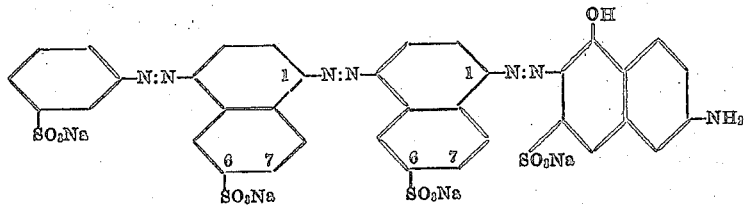

the other constituent having the same formula except that one or both of the sulphonic groups of the middle components are in the 7 position.

*Example 2.*—If in the above example 31.5 kilograms of 2-phenyl-amino-5-naphthol-7-sulphonic acid (phenyl J-acid) is used in place of 24 kilograms of 2-amino-5-naphthol-7-sulphonic acid (J-acid), a dyestuff of similar properties is obtained. The blue color of its aqueous solution is less sensitive to hydrochloric acid. The color of its solution in concentrated sulphuric acid is dark blue, and on dilution with water it comes out as a dark blue precipitate. Strong reducing agents destroy the dye, giving 1-aminobenzene-3-sulphonic acid, 1:4-naphthylenediamine-6-(7)-sulphonic acid, and 2-phenylamine - 6 - amino - 5 - naphthol-7-sulphonic acid. The shade of the dyeing on cotton is greener than is given by the dye described in Example 1 but its fastness properties are the same. The dye made in accordance with this second example has most probably the following graphical formula:

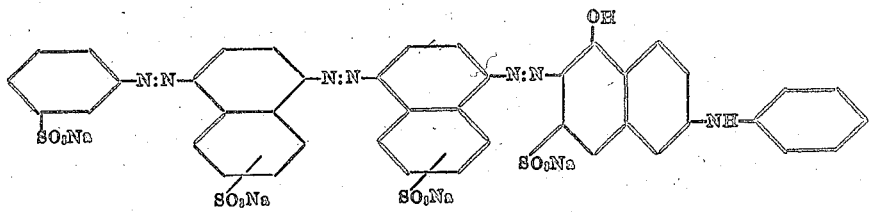

the sulphonic groups of the middle components being in beta positions.

In both examples the commercial Cleve's acid, which is a mixture of the 1:6- and the 1:7-naphthylamine-sulphonic acids, may be substituted by either of those isomers alone.

We claim:

1. A trisazo dye of the general formula:

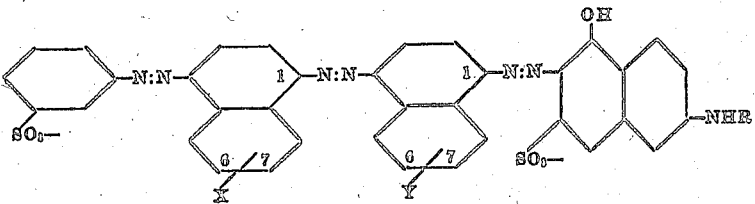

where X represents a sulphonic group in a beta position; Y represents a sulphonic group in a beta position; and R represents hydrogen or a hydrocarbon radical, said dye being capable of dyeing unmordanted cotton blue shades fast to light.

2. A trisazo dye of the following general formula:

$$\text{SO}_3\text{M} \quad \text{—N:N—R}_1\text{—N:N—R}_2\text{—N:N—R}_3$$

where $R_1$ and $R_2$ represent sulphonaphthylene radicals, $R_3$ stands for a J-acid compound, and M for an inorganic radical.

3. A trisazo dye of the following general formula:

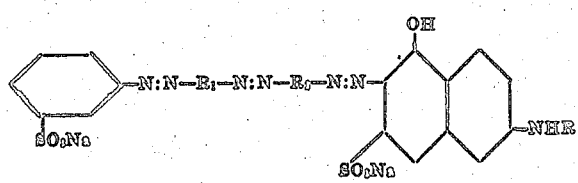

where R stands for an aryl radical, and $R_1$ and $R_2$ represent beta-sulpho-1, 4-naphthylene radicals, said dye yielding on unmordanted cotton blue shades fast to light.

4. The new trisazo dye of the following formula:

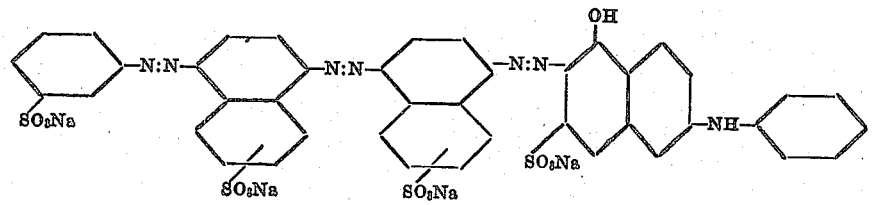

in which commercial Cleve's acid containing varying amounts of 1-naphthylamine-7-sulphonic acid, together with 1-naphthylamine-6-sulphonic acid, is used to give the middle azo components; this dye being a dark powder of bronzy appearance, giving a blue solution in water from which hydrochloric acid precipitates the acid dye; the dye being soluble in concentrated sulphuric acid with a dark blue color and precipitating in a dark blue flocculent form on dilution with water; dyeing cotton in the usual manner to a brilliant greenish blue color which is extremely fast to sunlight.

In testimony whereof we affix our signatures.

HAROLD E. WOODWARD.
WILLIAM W. BAUER.